(12) United States Patent
Vivanco et al.

(10) Patent No.: US 11,452,010 B2
(45) Date of Patent: Sep. 20, 2022

(54) METHODS, SYSTEMS, AND DEVICES FOR CALL SESSION MANAGEMENT VIA DYNAMIC CONTROL OF DUAL CONNECTIVITY IN A NETWORK

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 31 days.

(21) Appl. No.: 17/095,566

(22) Filed: Nov. 11, 2020

(65) Prior Publication Data

US 2022/0150769 A1 May 12, 2022

(51) Int. Cl.
*H04W 4/00* (2018.01)
*H04W 36/00* (2009.01)
*H04W 36/38* (2009.01)
*H04W 88/06* (2009.01)

(52) U.S. Cl.
CPC ... *H04W 36/0069* (2018.08); *H04W 36/0022* (2013.01); *H04W 36/38* (2013.01); *H04W 88/06* (2013.01)

(58) Field of Classification Search
CPC ......... H04W 36/0011; H04W 36/0016; H04W 36/0022; H04W 36/0033; H04W 36/0069; H04W 36/0083; H04W 36/0085; H04W 36/34; H04W 36/38
See application file for complete search history.

(56) References Cited

U.S. PATENT DOCUMENTS

| 9,379,933 | B1 * | 6/2016 | Bishop | H04L 29/06476 |
| 2017/0094576 | A1 * | 3/2017 | Kazmi | H04W 36/14 |
| 2022/0061050 | A1 | 2/2022 | Vivanco et al. | |

OTHER PUBLICATIONS

"WirelessMoves—5G—Part 3—Dual Connectivity (EN-DC)", https://blog.wirelessmoves.com/2017/09/5g-part-3-dual-connectivity-en-dc.html, Sep. 30, 2017, 3pgs.

* cited by examiner

*Primary Examiner* — Matthew W Genack
(74) *Attorney, Agent, or Firm* — Guntin & Gust, PLC; Kenneth Kwan

(57) ABSTRACT

Aspects of the subject disclosure may include, for example, obtaining data relating to a user equipment, where the user equipment is communicatively coupled to a first network node, and where the first network node employs a first radio access technology, determining whether there is an initiation of a call session for the user equipment to be facilitated by the first network node, determining, according to the data relating to the user equipment and responsive to determining that there is an initiation of a call session, a probability that the call session will become disconnected, and controlling connectivity between the user equipment and a second network node based on the probability that the call session will become disconnected, wherein the second network node employs a second radio access technology. Other embodiments are disclosed.

20 Claims, 8 Drawing Sheets

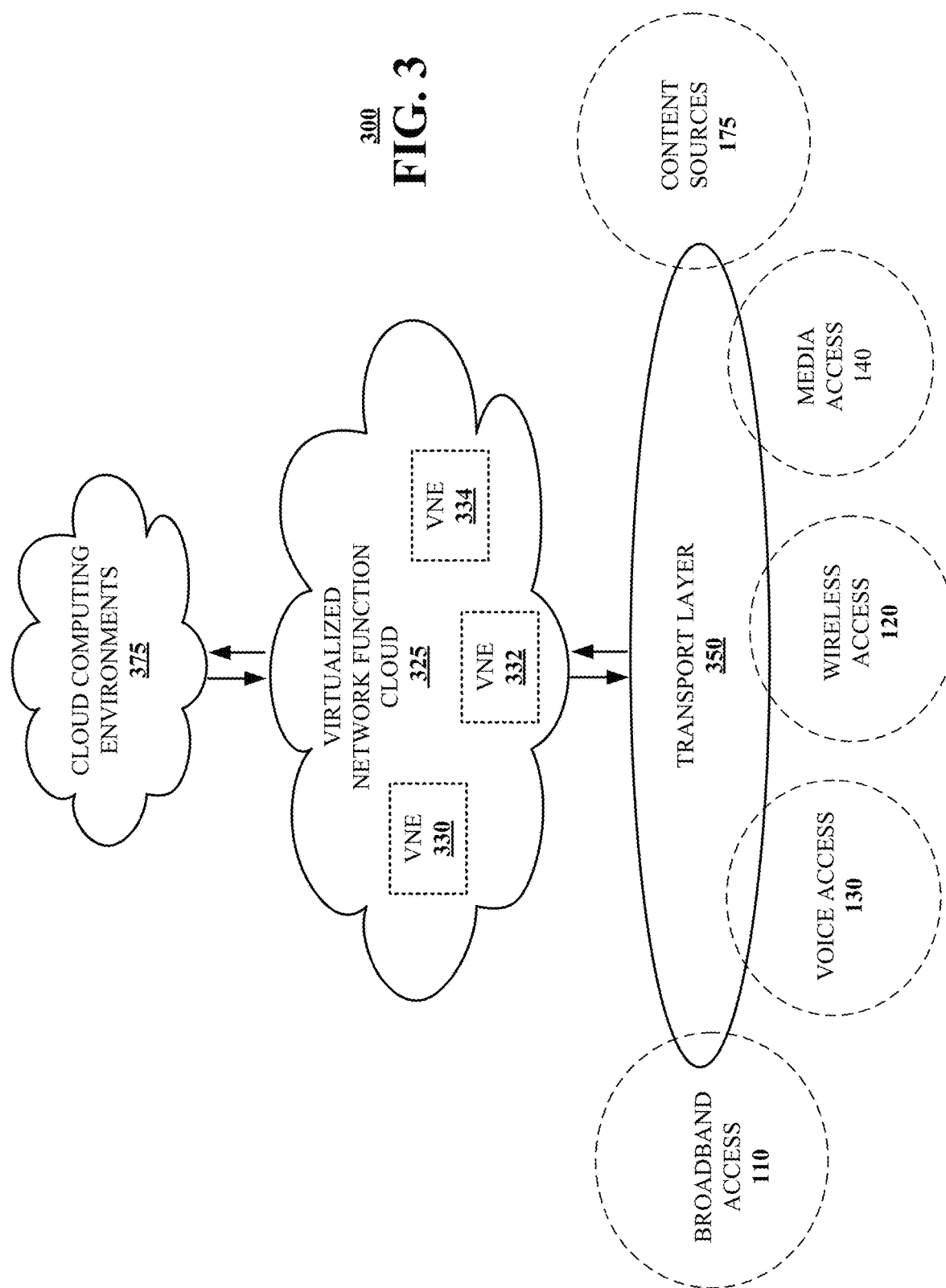

METHODS, SYSTEMS, AND DEVICES FOR CALL SESSION MANAGEMENT VIA DYNAMIC CONTROL OF DUAL CONNECTIVITY IN A NETWORK

FIELD OF THE DISCLOSURE

The subject disclosure relates to call session (e.g., voice over Long Term Evolution (VoLTE)) management via dynamic control of dual connectivity (e.g., EN-DC) in a network.

BACKGROUND

Some cellular-based networks support a dual connectivity mode of operation, such as E-UTRAN New Radio (NR)—Dual Connectivity (EN-DC). In such networks, a user equipment that is equipped with appropriate radio access technologies (RATs) can simultaneously transmit an E-UTRA uplink signal and an NR uplink signal. However, a maximum output power, or power class, can restrict the total amount of transmission power that a user equipment can output at a time. For example, the sum of the output power for transmissions over LTE (P_LTE) and the output power for transmissions over 5G (P_NR) can be capped at a power class (P_powerclass) (e.g., at 23 decibel-milliwatts (dBm)).

Certain user equipment (e.g., "Type 1" user equipment) are equipped with dynamic power sharing capabilities that enable the user equipment to dynamically split output power between transmissions in the E-UTRA band and the NR band, and continue to operate over both bands despite the sum of P_LTE and P_NR exceeding P_powerclass. This type of user equipment can thus operate at a cell center and in coverage-limited areas or situations with minimal to no performance compromises.

Other user equipment (e.g., "Type 2" user equipment) do not support dynamic power sharing. For this type of user equipment, for example, if the sum of the P_LTE and P_NR exceeds P_powerclass, a network operator can limit uplink coverage by requiring that the sum of P_LTE and P_NR be less than or equal to Ppowerclass. Alternatively, the network operator can restrict the user equipment to a single uplink operation mode (i.e., constrained to only time division multiplexing (TDM)-based, single uplink transmissions) by disabling one of the bands to maintain service reliability of the other band.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1A:
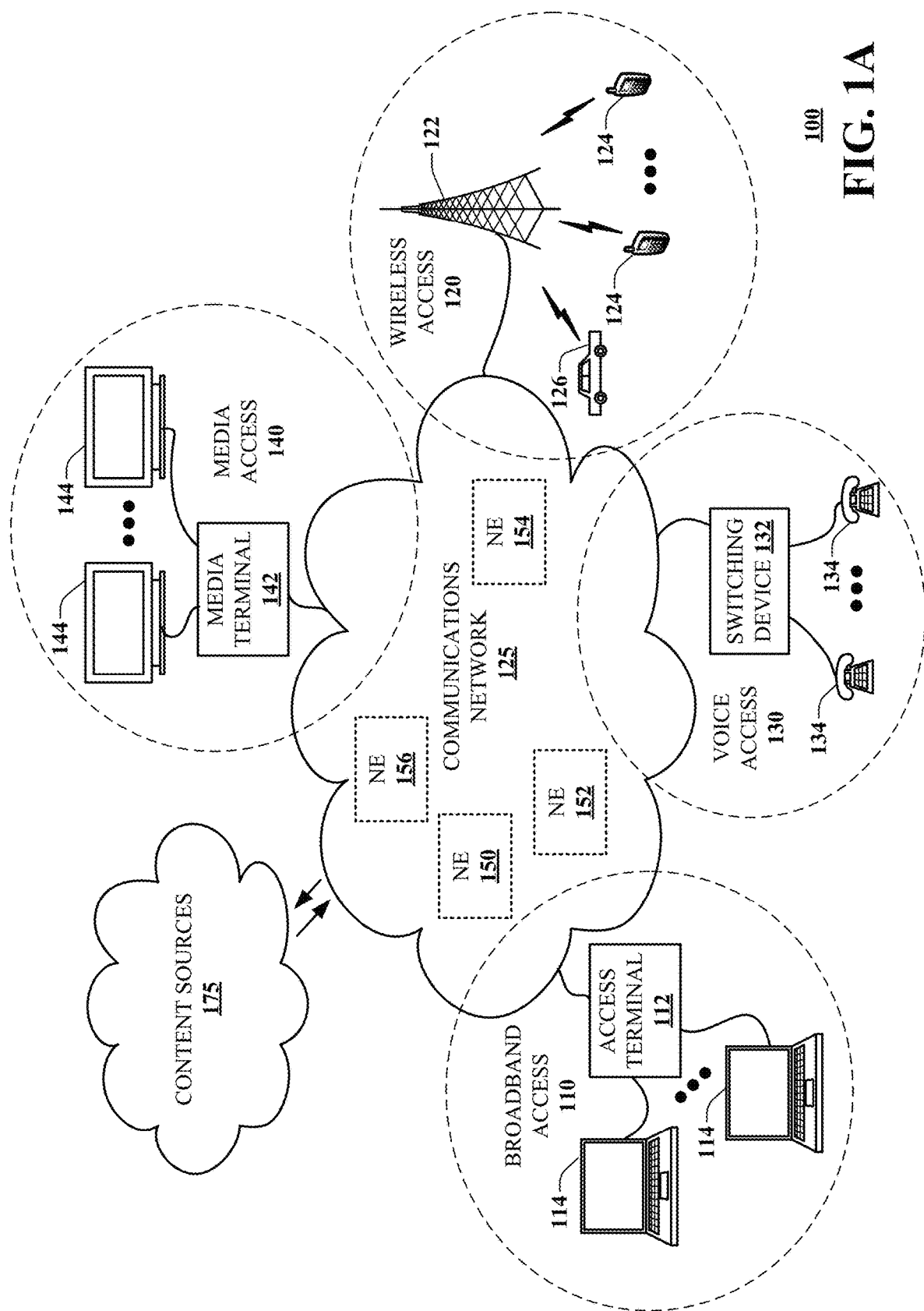
FIG. 1A is a block diagram illustrating an exemplary, non-limiting embodiment of a communication network in accordance with various aspects described herein.

The subject disclosure describes, among other things, illustrative embodiments for a system that is capable of providing call session management via dynamic control, for a user equipment, of a dual connectivity mode of a network—e.g., EN-DC, where network access is provided over a first band (e.g., an LTE band) and a second band (e.g., an NR band). In exemplary embodiments, the system is capable of controlling connectivity between the user equipment and the network over the second band by activating, or permitting activation of, the dual connectivity mode of the network, based on a likelihood (or probability) of service interruption in the first band. In various embodiments, the service in the first band can include a voice call session, such as, for example, a VoLTE call session or the like. In some embodiments, the system can determine the probability of service interruption based on one or more factors, such as, for example, network resource demand by the user equipment, signal strength in the first band (e.g., as detected by the user equipment), and/or transmission power output by the user equipment in the second band.

Controlling connectivity of the user equipment in the second band of the network, based on a probability of service interruption in the first band, enables the user equipment to continue to utilize the second band in cases where a level of risk of such service interruption satisfies a threshold (e.g., is less than or equal to the threshold, or is otherwise low, medium, or the like). For example, in a case where a user equipment is utilizing the second band, and a call session is to be initiated for the user equipment over the first band, embodiments of the system, described herein, can maintain the dual connectivity mode of the network for the user equipment, such that the user equipment can continue to utilize the second band, if the system determines that a probability of the call session being interrupted (e.g., dropped or the like) satisfies the threshold (e.g., is less than or equal to the threshold, or is otherwise low, medium, or the like). As another example, in a case where a user equipment is not utilizing the second band, and a call session is ongoing at the user equipment, embodiments of the system, described herein, can maintain the dual connectivity mode of the network, so as to permit the user equipment to establish a connection with the network over the second band as needed, if the system determines that a probability of the call session being interrupted satisfies the threshold (e.g., is less than or equal to the threshold, or is otherwise low, medium, or the like). Controlling the dual connectivity mode of a network based on probabilities of service interruptions, as described herein, reduces or eliminates unneeded deactivation of the dual connectivity mode, and possible later reactivation thereof (e.g., such as after a VoLTE call session ends), which conserves network resources and computing resources. Permitting user equipment to remain connected to the network over the second band also reduces or eliminates service interruptions in the second band, which improves overall user experience.

One or more aspects of the subject disclosure include a device, comprising a processing system including a processor, and a memory that stores executable instructions that, when executed by the processing system, facilitate performance of operations. The operations can include obtaining data relating to a user equipment, where the user equipment is communicatively coupled to a first network node, and where the first network node employs a first radio access technology. Further, the operations can include determining whether there is an initiation of a call session for the user equipment to be facilitated by the first network node, determining, according to the data relating to the user equipment and responsive to determining that there is an initiation of a call session for the user equipment to be facilitated by the first network node, a probability that the call session will be interrupted, and controlling connectivity between the user equipment and a second network node based on the probability that the call session will be interrupted, where the second network node employs a second radio access technology.

One or more aspects of the subject disclosure include a non-transitory machine-readable storage device, comprising executable instructions that, when executed by a processing system including a processor, facilitate performance of operations. The operations can include receiving data relating to a user equipment, where the user equipment is communicatively coupled to a first network node, and where the first network node employs a first radio access technology. Further, the operations can include determining that there is an ongoing call session at the user equipment facilitated by the first network node, determining, according to the data relating to the user equipment and responsive to the determining that there is an ongoing call session at the user equipment facilitated by the first network node, a probability that a quality of the ongoing call session will become impaired, and controlling connectivity between the user equipment and a second network node based on the probability that the quality of the ongoing call session will become impaired, where the second network node employs a second radio access technology.

One or more aspects of the subject disclosure include a method. The method can comprise obtaining, by a processing system including a processor, data relating to a user equipment, where the user equipment is communicatively coupled to a first network node of a network and to a second network node of the network, where the first network node employs a first radio access technology, and where the second network node employs a second radio access technology. Further, the method can include determining, by the processing system, whether there is an initiation of a call session for the user equipment to be facilitated by the first network node, determining, by the processing system, according to the data relating to the user equipment and responsive to determining that there is an initiation of a call session for the user equipment to be facilitated by the first network node, that a probability of the call session becoming disconnected satisfies a threshold, and maintaining, by the processing system, connectivity between the user equipment and the second network node responsive to the determining that the probability of the call session becoming disconnected satisfies the threshold.

Referring now to FIG. 1A, a block diagram is shown illustrating an example, non-limiting embodiment of a communication network or system 100 in accordance with various aspects described herein. For example, the communication system 100 can facilitate in whole or in part call session management via dynamic control, for a user equipment, of a dual connectivity mode of a network—e.g., EN-DC, where network access is provided over a first band (e.g., an LTE band) and a second band (e.g., an NR band)—by selectively activating and/or deactivating a connection between the user equipment and the network over the second band, depending on a probability of service interruption in the first band.

The communication network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communication network 125 includes a plurality of network elements (NE) 150, 152, 154, 156, etc. for facilitating the broadband access 110, wireless access 120, voice access 130, media access 140 and/or the distribution of content from content sources 175. The communication network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communication network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communication network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
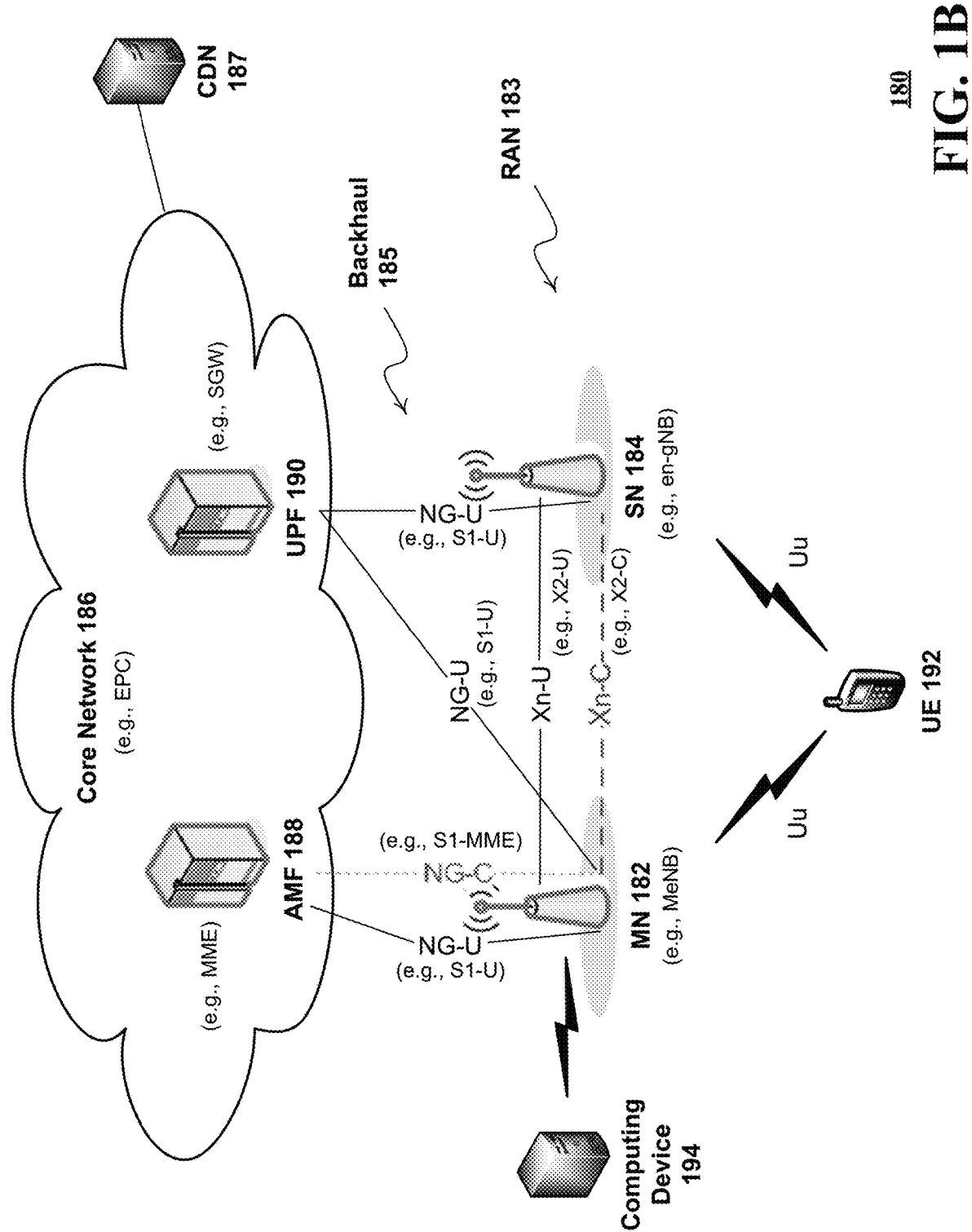
FIG. 1B is a block diagram illustrating an example non-limiting embodiment of a communication network or system functioning within or in conjunction with the communication network of FIG. 1A in accordance with various aspects described herein.

Referring now to FIG. 1B, a block diagram is shown illustrating an example non-limiting embodiment of a communication network (or system) 180 functioning within or in conjunction with the system 100 of FIG. 1A in accordance with various aspects described herein. Communication network 180 can be configured to provide Multi-Radio Dual Connectivity (MR-DC) via a radio access network (RAN) 183 that includes one or more network nodes (e.g., access points, such as base stations or the like). In one example, RAN 183 can include a master node (MN) 182 and a secondary node (SN) 184. In one example, each of MN 182 and SN 184 can employ a different radio access technology (RAT). A user equipment (UE) 192 can be equipped with multiple transmitter (Tx) devices and/or multiple receiver (Rx) devices configured to communicate with, and utilize network resources provided via, the MN 182 and the SN 184. The MN 182 and/or the SN 184 can be operated with shared spectrum channel access.

One or more of the nodes 182, 184 of the RAN 183 can be in communication with a mobility core network 186 via a backhaul network 185. The core network 186 can be in further communication with one or more other networks (e.g., one or more content delivery networks (one of which, CDN 187 is shown)), one or more services and/or one or more devices. The core network 186 can include various network devices and/or systems that provide a variety of functions, such as mobility management, session management, data management, user plane and/or control plane function(s), policy control function(s), and/or the like. As shown in FIG. 1B, the core network 186 can include an Access Mobility and Management Function (AMF) 188 configured to facilitate mobility management in a control plane of the communication network 180, and a User Plane Function (UPF) 190 configured to provide access to a data network, such as a packet data network (PDN), in a user (or data) plane of the communication network 180. The AMF 188 and the UPF 190 can each be implemented in one or more computing devices (e.g., one or more server devices or the like). In some embodiments, the core network 186 can additionally, or alternatively, include one or more devices implementing other functions, such as a master user database server device for network access management, a PDN gateway server device for facilitating access to a PDN, a Unified Data Management (UDM) function, a Session Management Function (SMF), a Policy Control Function (PCF), and/or the like.

The MN 182 and the SN 184 can be communicatively coupled to one another via an Xn-C interface configured to facilitate control plane traffic between the MN 182 and the SN 184, and can also be communicatively coupled to one another via an Xn-U interface configured to facilitate user plane traffic between the MN 182 and the SN 184.

The AMF 188 can be communicatively coupled to the MN 182 via an NG-C interface in the control plane. In some embodiments, the AMF 188 can additionally, or alternatively, be communicatively coupled to the SN 184 via a similar interface in the control plane. The UPF 190 can be communicatively coupled to the MN 182 via an NG-U interface in the user plane, and can be communicatively coupled to the SN 184 via a similar NG-U interface in the user plane.

Each of the MN 182 and the SN 184 can include a radio resource control (RRC) entity capable of exchanging network traffic (e.g., protocol data units (PDUs)) with the UE 192. In some embodiments, the UE 192 can communicate with the MN 182 via a Uu radio interface in an RRC protocol layer of the control plane. In some embodiments, the UE 192 can have a single RRC state, such as a single control plane connection with the core network 186 based on the RRC entity of the MN 182. In some embodiments, the MN 182 can facilitate control plane communications between the SN 184 and the UE 192 by, for example, transporting RRC PDUs, originating from the SN 184, to the UE 192.

The communication network 180 can provide multiple bearer types in the data plane. For example, the bearer types can include a Master Cell Group (MCG) bearer type, a Secondary Cell Group (SCG) bearer type, and a split bearer type. Depending on the RATs employed by the MN 182 and the SN 184, various packet data convergence protocol (PDCP) configurations can be implemented for the different bearer types. Thus, in various embodiments, each bearer type (e.g., the MCG bearer type, the SCG bearer type, and the split bearer type) can be terminated either in the MN 182 or in the SN 184.

In some embodiments, the communication network 180 can be configured to provide dual connectivity according to an E-UTRAN New Radio (NR) Dual Connectivity (EN-DC) configuration. In some embodiments, the EN-DC configuration can provide a 5G Non-Standalone (NSA) implementation. In one example (related to a 5G NSA implementation), an LTE radio and the core network 186 can be utilized as an anchor for mobility management and coverage for an additional 5G (or NR) carrier. Network traffic can be split in a variety of manners, such as across LTE and NR at an eNodeB, at the core network 186, and/or at an NR cell.

In embodiments in which the communication network 180 is configured to provide the EN-DC configuration, the MN 182 can include a master eNodeB (MeNB) that provides E-UTRAN access, and the SN 184 can include an en-gNodeB (en-gNB) that provides NR access. The core network 186 can be (or can include) an evolved packet core (EPC), where the AMF 188 is implemented as a mobility management entity (MME) and the UPF 190 is implemented as a serving gateway (SGW). The core network 186 can include one or more devices that implement one or more functions, such as a Home Subscriber Server (HSS) for managing user access, a PDN gateway server device for facilitating access to a PDN, and/or the like.

In an EN-DC configuration, the MN (MeNB) 182 and the SN (en-gNB) 184 can be communicatively coupled to one another via an X2-C interface in the control plane, and via an X2-U interface in the user plane. The AMF (MME) 188 can be communicatively coupled to the MN (MeNB) 182 via an S1-MME interface in the control plane. In some embodiments, the AMF (MME) 188 can additionally, or alternatively, be communicatively coupled to the SN (en-gNB) 184 via a similar interface in the control plane. The UPF (SGW) 190 can be communicatively coupled to the MN (MeNB) 182 via an S1-U interface in the user plane, and can also be communicatively coupled to the SN (en-gNB) 184 via a similar S1-U interface in the user plane, to facilitate data transfer for the UE 192.

In the EN-DC configuration, the MeNB can include an E-UTRA version of an RRC entity and the en-gNB can include an NR version of an RRC entity. Additionally, in the EN-DC configuration, an E-UTRA PDCP or an NR PDCP can be configured for MeNB terminated MCG bearer types, and an NR PDCP can be configured for all other bearer types.

In some embodiments of the EN-DC configuration, the AMF (MME) 188 can communicate exclusively with the MN (MeNB) 182, but both the MeNB and the en-gNB can access the core network (e.g., EPC) 186. In various embodiments, data traffic can be split between the LTE and NR RATs 182, 184, but where the MN (MeNB) 182 maintains sole control of the dual connectivity mode of the communication network 180. The UE 192 can access the core network (e.g., EPC) 186 by establishing a connection with the MN (MeNB) 182. If the UE 192 supports EN-DC and is capable of communicating in the NR band (e.g., if the UE 192 includes an LTE communication unit, such as an LTE Rx/Tx radio and protocol stack, and an NR communication unit, such as an NR Rx/Tx radio and protocol stack), the MN (MeNB) 182 can instruct the UE 192 to obtain measurements of, and provide measurement report(s) on, the NR band. In a case where the UE 192 identifies a candidate network node in the NR band, such as the SN (en-gNB) 184, the MN (MeNB) 182 can communicate one or more parameters to the en-gNB (e.g., via the X2-C interface) to enable the en-gNB to establish a connection with the UE 192. Upon establishing such a connection, the MN (MeNB) 182 can then forward a portion of any incoming user data, directed for the UE 192, to the SN (en-gNB) 184 for transmission to the UE 192, thereby enabling the UE 192 to simultaneously communicate over LTE and NR to achieve increased data rates. In some embodiments, the MN (MeNB) 182 can request, or otherwise, instruct, the UPF (SGW) 190 to exchange user data directly with the SN (en-gNB) 184. In such embodiments, the en-gNB can similarly forward a portion of any incoming user data, directed for the UE 192, to the MeNB for transmission to the UE 192.

As shown in FIG. 1B, the communication network 180 can include a computing device 194 communicatively coupled with the MN 182. The computing device 194 can include one or more devices, such as server device(s), configured to provide one or more functions or capabilities, such as dual connectivity control functions, edge computing functions and/or capabilities, provisioning of data and/or services for user equipment (e.g., such as UE 192), data analytics function(s), machine learning and/or artificial intelligence function(s) that provide resource management capabilities (e.g., mobility management, admission control, interference management, etc.), automatic planning functions, configuration functions, optimization functions, diagnostic functions, healing functions, and/or the like. For example, in some implementations, the computing device 194 can include, or be implemented in, a multi-access edge computing (MEC) device or device(s), a RAN Intelligent Controller (MC), a Self-Organizing Network (SON), and/or the like. In some embodiments, such as in a case where the core network 186 includes an EPC, the computing device 194 can include, or be implemented in, an MME, an SGW, and/or the like.

It is to be understood and appreciated that the quantity and arrangement of nodes, devices, and networks shown in FIG. 1B are provided as an example. In practice, there may be additional nodes, devices, and/or networks, fewer nodes, devices, and/or networks, different nodes, devices, and/or networks, or differently arranged nodes, devices, and/or networks than those shown in FIG. 1B. For example, the communication network 180 can include more or fewer MNs 182, SNs 184, AMF device(s) 188, UPF device(s) 190, UE's 192, computing devices 194, core networks 186, etc. Furthermore, two or more nodes or devices shown in FIG. 1B may be implemented within a single node or device, or a single node or device shown in FIG. 1B may be implemented as multiple, distributed nodes or devices. Additionally, or alternatively, a set of nodes or devices (e.g., one or more nodes or devices) of the communication network 180 may perform one or more functions described as being performed by another set of nodes or devices of the communication network 180.

Figure 2A:
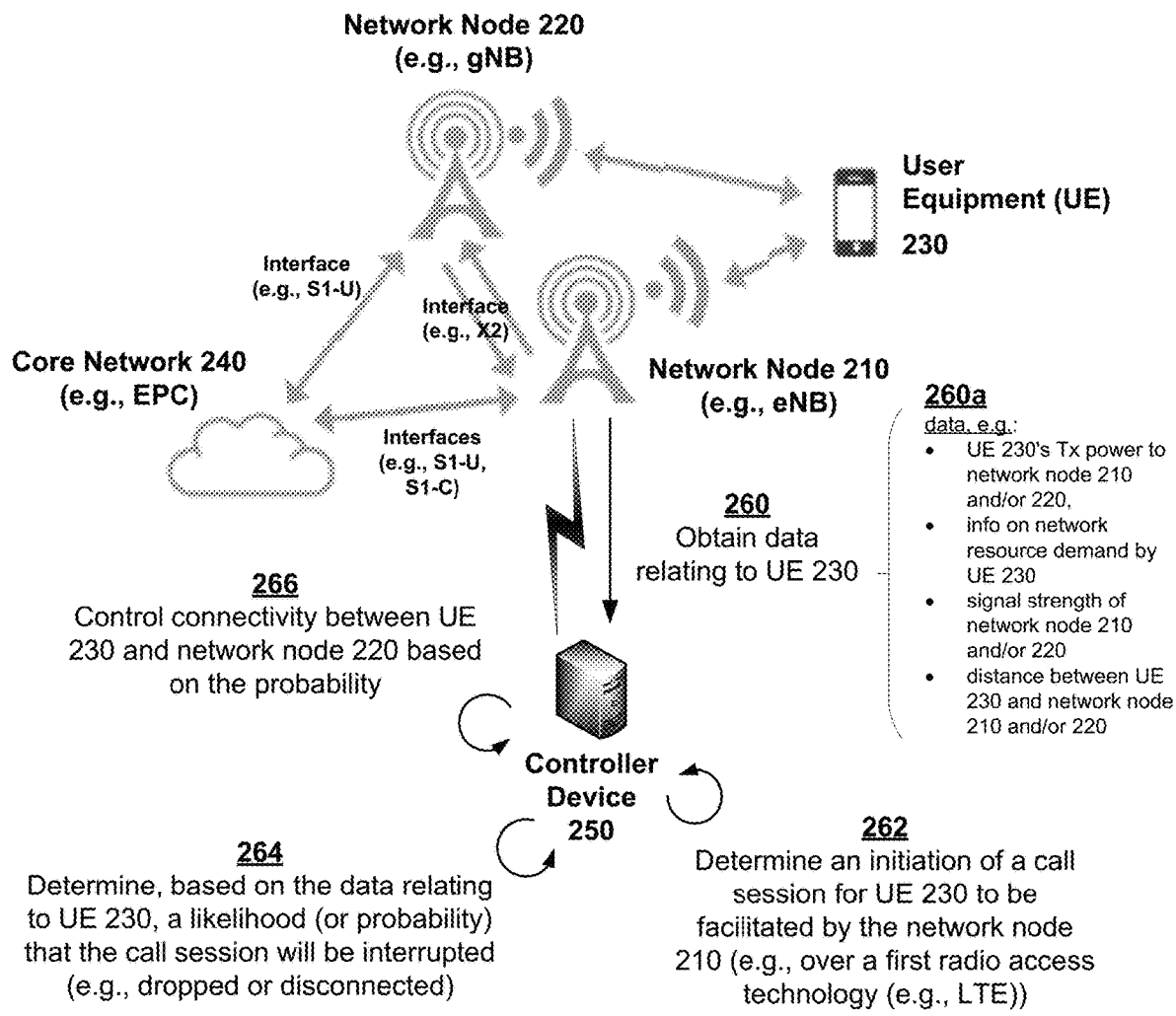
FIG. 2A is a block diagram illustrating an example, non-limiting embodiment of a system functioning within or in conjunction with the communication network of FIG. 1A and/or the communication network of FIG. 1B in accordance with various aspects described herein.

FIG. 2A is a block diagram illustrating an example, non-limiting embodiment of a network system 200 that is configured to provide call session management via dynamic control, for a user equipment, of a dual connectivity mode of a network—e.g., EN-DC, where network access is provided over a first band (e.g., an LTE band) and a second band (e.g., an NR band)—by selectively activating and/or deactivating a connection between the user equipment and the network over the second band, depending on a probability of service interruption in the first band. The network system 200 can function in, or in conjunction with, various communication systems and/or networks including the communication network 100 of FIG. 1A and/or the communication network 180 of FIG. 1B in accordance with various aspects described herein.

As shown in FIG. 2A, the network system 200 can include a network node 210 (e.g., an access point, such as a base station or the like) that employs a first radio access technology, and a network node 220 that employs a second radio access technology. The network nodes 210 and 220 can form, or be a part of, a radio access network (RAN) that facilitates communications between a user equipment 230 and a core network 240. The user equipment 230 can include, for example, one or more data terminals 114, one or more mobile devices 124, one or more vehicles 126, one or more display devices 144, or one or more other client devices.

In some embodiments, the RAN can be configured for EN-DC. For example, the network node 210 can include an eNB (e.g., a Master eNB, or MeNB) of one cell, the network node 220 can include a gNB (e.g., a secondary NB, or SgNB) of another cell, and the core network 140 can include an evolved packet core (EPC). In various embodiments, the network system 200 can include various quantities of cells (e.g., primary cells (Pcells) and/or secondary cells (Scells)), various quantities of network nodes in a cell, and/or various types of network nodes and/or cells.

As shown in FIG. 2A, the network system 200 can include a controller device 250 that is communicatively coupled to the network node 210. In various embodiments, the controller device 250 can include, or otherwise correspond to, the computing device 194 of the communication network 180 described above. In various embodiments, the controller device 250 can be implemented in a centralized network hub or node device at, or proximate to, an edge of a network provider's (e.g., a cellular network provider's) overall network. In some embodiments, the controller device 250 can be implemented in a multi-access edge computing (MEC) device or devices. As the name/nomenclature implies, a MEC device may reside at a location that is at, or proximate, to an edge of the network system 200, which may be useful in reducing (e.g., minimizing) delays associated with provisioning of data or services to one or more (requesting) devices. In some embodiments, the controller device 250 can additionally, or alternatively, be implemented in a Self-Organizing Network (SON) or other similar network that provides automatic planning functions, configuration functions, optimization functions, diagnostic functions, and/or healing functions for a network. In some embodiments, the controller device 250 can additionally, or alternatively, be implemented in a RAN Intelligent Controller (RIC) or other similar device or device(s) that leverages data analytics and machine learning and/or artificial intelligence to provide resource management capabilities, such as mobility management, admission control, and interference management, at an edge of a network. In various embodiments, the controller device 250 may be implemented in one or more devices included in the core network 240. For example, in a case where the core network 240 includes an EPC, the controller device 250 can include, or be implemented, in a mobility management entity (MME) gateway, a serving gateway (SGW), and/or the like.

In cellular-based networks that support a dual connectivity mode of operation, such as an EN-DC configuration, a user equipment equipped with appropriate RATs can simultaneously transmit uplink signals over multiple bands (e.g., an E-UTRA uplink signal over an LTE band and an NR uplink signal in the NR band). In an EN-DC configuration, the sum of the output power for transmissions over LTE (P_LTE) and the output power for transmissions over 5G (P_NR) may be capped at a power class (Ppowerclass) (e.g., at 23 dBm). User equipment that do not support dynamic power sharing (e.g., Type 2 devices) can be restricted to a single uplink transmission operating mode—i.e., only LTE—where P_LTE can reach as high as Ppowerclass. However, this limits the ability of the user equipment to utilize an otherwise available NR band for data transmissions.

In an alternate situation, where P_LTE+P_NR≤P_powerclass is instead set to address the lack of dynamic power sharing capability in a Type 2 user equipment, the user equipment might not be able to output Tx power for a single RAT, such as LTE, up to the full P_Powerclass. This can result in poor uplink coverage for that RAT and/or slower uplink data rates/throughput for the user equipment (e.g., increased call drop rates and/or poor service experience at a cell edge), since P_LTE will need to decrease when P_NR increases.

In various embodiments, the network system 200 is capable of providing, for a user equipment, dynamic control of a dual connectivity mode of a network based on a probability of service interruption in one of the bands of the network. For example, in an EN-DC configuration, in which network access is provided over a first band (e.g., an LTE band) and a second band (e.g., an NR band), the network system 200 can activate, or deactivate, a connection between the user equipment and the network over the second band, depending on a probability of service interruption in the first band. The probability of service interruption, such as a VoLTE call drop or the like, can be based on the Tx power output in the first band (e.g., LTE band) and/or the Tx power output in the second band (e.g., the NR band). Because the Tx power output in the first band may vary depending on the network resource demand of the user equipment in the first band and/or depending on the signal strength of a network node in the first band (e.g., the signal strength of the network node 210 relative to the user equipment 230), which may vary depending on a distance between the user equipment and the network node in the first band (e.g., since a shorter distance can result in a higher signal strength and thus a lower required Tx power output), the probability can be determined based on (e.g., any available information regarding) one or more of the Tx power output in the first band, the network resource demand of the user equipment in the first band, the signal strength of the network node in the first band, and the distance between the user equipment and the network node in the first band. Similarly, because the Tx power output in the second band may vary depending on the network resource demand of the user equipment in the second band and/or depending on the signal strength of a network node in the second band (e.g., the signal strength of the network node 220 relative to the user equipment 230), which may vary depending on a distance between the user equipment and the network node in the second band (e.g., since a shorter distance can result in a higher signal strength and thus a lower required Tx power output), the probability can additionally, or alternatively, be determined based on (e.g., any available information regarding) one or more of the Tx power output in the second band, the network resource demand of the user equipment in the second band, the signal strength of the network node in the second band, and the distance between the user equipment and the network node in the second band.

As shown in FIG. 2A, and as shown by reference number 260, the controller device 250 can obtain data relating to the user equipment 230. In various embodiments, the controller device 250 can obtain the data from the network node 210 and/or the network node 220. In some embodiments, the controller device 250 can periodically obtain the data (e.g., as the data is provided by the user equipment 230 to the network node 210 and/or the network node 220).

In some embodiments, and as shown by reference number 260a, the data can include information regarding, or relating to, a Tx power of the user equipment 230 to the network node 210 (e.g., an LTE uplink Tx power) and/or a Tx power of the user equipment 230 to the network node 220 (e.g., an NR uplink Tx power). In some embodiments, information regarding Tx power can include an actual Tx power value. In some embodiments, in a case where the user equipment 230 does not provide actual Tx power value(s), the controller device 250 can be configured to determine estimated Tx power values. For example, the controller device 250 can obtain other data from the network node 210 and/or the network node 220, such as signal measurement data, and determine estimated Tx power value(s) for the user equipment 230.

In some embodiments, and as shown by reference number 260a, the data can include information regarding, or relating to, network resource usage and/or demand of the user equipment 230 in the first band of the network and/or the second band of the network, information regarding, or relating to, signal strength(s) of one or more network nodes, such as the network node 210 and/or the network node 220, that are within a communicable range of the user equipment 230, and/or the like.

In some embodiments, the data can include information regarding, or relating to, a location or position of the user equipment 230 relative to a network node, such as the network node 210 and/or the network node 220. In some embodiments, the information can be indicative of a distance between the user equipment 230 and the network node. For example, the information can include timing advance data, which may indicate a time or duration of travel of communications, between the user equipment 230 and the network node 210 and/or the network node 220, that can be used to determine a distance between the user equipment 230 and that network node.

In many instances, a different modulation and coding scheme (MCS) for communications between a user equipment and a network node can be assigned and utilized depending on a distance between the user equipment and the network node. For example, the data relating to the user equipment 230 can include an assigned MCS to use for communications transmitted via the first radio access technology (e.g., LTE or higher generation network technology) and/or an assigned MCS to use for communications transmitted via the second radio access technology (e.g., 5G, or NR, or higher generation network technology). In various embodiments, these MCS assignments can be used to determine a position of the user equipment 230 relative to the network node 210 and/or the network node 220.

In some embodiments, the data can include information regarding, or relating to, the capabilities of the user equipment 230. For example, the information can identify whether the user equipment 230 is equipped with radio access technologies (e.g., receivers, transmitters, transceivers, etc.) that support dual connectivity, whether the user equipment 230 can perform dynamic power sharing, possible data transfer rates of the user equipment, and/or the like.

In various embodiments, the data relating to the user equipment 230 can additionally, or alternatively, include information regarding an identity of the user equipment 230, a direction of movement of the user equipment 230, a speed of travel of the user equipment 230, physical layer properties of the user equipment 230, signal round trip times (RTT), historical location information relating to the user equipment 230, behavior information relating to the user equipment 230, and/or the like. In some embodiments, the controller device 250 can be configured to perform a trajectory analysis of the user equipment 230 to predict a future location of the user equipment 230 based on some or all of this information.

As shown by reference number 262, the controller device 250 can determine whether there is an initiation of a call session for the user equipment 230 to be facilitated by the network node 210. For example, the controller device 250 can determine whether there is an initiation of a VoLTE call (and/or a video over LTE (ViLTE) call or the like) for the user equipment 230. The initiation of the call session can be performed by the user equipment 230 (e.g., in response to a user of the user equipment 230 instructing the user equipment 230 to initiate the call), or alternatively, can be made by another user equipment located remotely from the user equipment 230. In either case, the controller device 250 can obtain information regarding the initiation of the call session from (or otherwise be notified of such an initiation by) the network node 210, the network node 220, and/or another device of the network system 200.

In a case where the controller device 250 determines that there is an initiation of a call session for the user equipment 230 to be facilitated by the network node 210, as shown by reference number 264, the controller device 250 can determine, based on the data relating to the user equipment 230, a likelihood (or probability) that the call session will be interrupted (e.g., dropped or disconnected). In various embodiments, the controller device 250 can determine the probability before the call session is established. In various embodiments, the controller device 250 can additionally, or alternatively, determine the probability while the call session is ongoing.

In various embodiments, the controller device 250 can determine the probability based on one or more information items in the data, such as, for example, information regarding, or relating to, a Tx power output in a first band of the network (e.g., an LTE band), a Tx power in a second band of the network (e.g., a 5G, or NR band), network resource usage and/or demand of the user equipment 230 in the first band of the network, network resource usage and/or demand of the user equipment 230 in the second band of the network, signal strength of the network node in the first band (e.g., the network node 210), signal strength of the network node in the second band (e.g., the network node 220), a distance between the user equipment 230 and the network node in the first band, a distance between the user equipment 230 and the network node in the second band, the capabilities of the user equipment 230, a projected trajectory of the user equipment 230, and/or the like.

In various embodiments, the controller device 250 can determine the probability to be low or high by comparing one or more of the foregoing information items and one or more corresponding thresholds. In some embodiments, for example, the controller device 250 can determine that the probability is low based on one or more of the following: the Tx power output in the second band satisfying a Tx power threshold (e.g., is less than or equal to the Tx power threshold), the network resource usage or demand of the user equipment 230 in the second band of the network satisfying a demand threshold (e.g., is less than or equal to the demand threshold), the signal strength of the network node in the first band (e.g., the network node 210), relative to the user equipment 230, satisfying a signal strength threshold (e.g., is greater than or equal to the signal strength threshold), and the distance between the user equipment 230 and the network node in the first band (e.g., the network node 210) satisfying a distance threshold (e.g., is less than or equal to distance threshold).

In some embodiments, for example, the controller device 250 can determine that the probability is high based on one or more of the following: the Tx power output in the second band not satisfying the Tx power threshold (e.g., is greater than or equal to the Tx power threshold), the network resource usage or demand of the user equipment 230 in the second band of the network not satisfying the demand threshold (e.g., is greater than or equal to the demand threshold), the signal strength of the network node in the first band (e.g., the network node 210), relative to the user equipment 230, not satisfying the signal strength threshold (e.g., is less than or equal to the signal strength threshold), and the distance between the user equipment 230 and the network node in the first band (e.g., the network node 210) not satisfying the distance threshold (e.g., is greater than or equal to distance threshold).

As an example, in an EN-DC configuration and assuming that P_powerclass is 23 dBm (or 200 milliwatts (mWatts)), in a case where a user equipment is located at or near a center of an LTE cell where signal strength in the first band may be strong, the Tx power output in the LTE band may be low, e.g., 50 mWatts, which may permit Tx power output in the NR band to be relatively high, e.g., to reach as high as 150 mWatts. In this case, so long as the signal strength in the first band satisfies a signal strength threshold (e.g., is greater than or equal to the signal strength threshold, or otherwise remains strong) and/or the Tx power output by the user equipment in the NR band satisfies a Tx power threshold (e.g., is less than or equal to the Tx power threshold (e.g., 150 mWatts, 145 mWatts, 130 mWatts, or the like), or otherwise remains low), the controller device 250 can determine the probability of a VoLTE call session being interrupted (e.g., dropped) to be low. As another example, in a case where a user equipment is far from a center of an LTE cell, the Tx power output in the LTE band may need to be high, e.g., 150 mWatts, which may restrict the Tx power output in the NR band, e.g., to a mere 50 mWatts. In this case, the controller device 250 can determine the probability of a VoLTE call session being interrupted (e.g., dropped) to be high based on a decrease in signal strength in the LTE band (e.g., based on the signal strength not satisfying the signal strength threshold, or otherwise being too low) and/or based on an increase in Tx output power by the user equipment in the NR band (e.g., based on the Tx output power not satisfying a Tx power threshold, or otherwise being too high). By determining the probability, the controller device 250 can dynamically control the dual connectivity mode for the user equipment, such as by maintaining the dual connectivity mode, or otherwise permitting establishment of the dual connectivity mode, when it is determined that a call session becoming interrupted in a first band (e.g., LTE band) is unlikely, and deactivating the dual connectivity mode, or otherwise, preventing establishment of the dual connectivity mode, when it is determined that a call session becoming interrupted in the first band is likely.

As shown by reference number 266, the controller device 250 can control connectivity between the user equipment 230 and the network node 220 based on the determined probability. In various embodiments, the controller device 250 can control the connectivity by providing instructions to the network node 210 and/or the network node 220. As an example, in a case where the controller device 250 determines that the probability of a call session being interrupted is high, the controller device 250 can disable, or otherwise deactivate, the dual connectivity mode for the user equipment 230 (e.g., to disable or deactivate the 5G leg) and/or prevent establishment of the dual connectivity mode for the user equipment 230 (e.g., to prevent any connection via the 5G leg) by providing instruction(s) to the network node 210 and/or the network node 220 to disable a communication session between the network node 220 and the user equipment 230 and/or to prevent establishment of a communication session between the network node 220 and the user equipment 230. If the call session has not yet been initiated for the user equipment 230, deactivating the dual connectivity mode for the user equipment 230 can ensure that sufficient power of the user equipment 230 is reserved for carrying out the call session over the first band. If the call session is already ongoing at the user equipment 230, preventing establishment of the dual connectivity mode for the user equipment 230 can ensure that the user equipment 230 has sufficient power to continue on with the call session over the first band.

As another example, in a case where the controller device 250 determines that the probability of a call session being interrupted is low, the controller device 250 can maintain the dual connectivity mode for the user equipment 230 (e.g., to maintain the user equipment 230's connection via the 5G leg) and/or permit establishment of the dual connectivity mode for the user equipment 230 (e.g., to permit a connection via the 5G leg) by providing instruction(s) to the network node 210 and/or the network node 220 to maintain a communication session between the network node 220 and the user equipment 230 and/or to permit establishment of a communication session between the network node 220 and the user equipment 230. In some embodiments, the controller device 250 can alternatively maintain, or permit establishment of, the dual connectivity mode for the user equipment 230 by not performing any additional actions and simply allowing the network nodes 210 and 230 to continuing operating as is with respect to the user equipment 230. Maintaining the dual connectivity mode for the user equipment 230 can permit the user equipment 230 to both initiate (and conduct) a call session over the first band and utilize the second band of the network as needed. If the call session is already ongoing at the user equipment 230, permitting establishment of the dual connectivity mode for the user equipment 230 can allow the user equipment 230 to connect to the network over the second band as needed.

In various embodiments, the controller device 250 can be configured to dynamically control the connectivity between the user equipment 230 and the network node 220. For example, the controller device 250 may periodically obtain updated data relating to the user equipment 230 and, based on the updated data, repeat some or all of the actions described above with respect to reference numbers 262, 264 and 266. In some cases, the probability of a call session being interrupted can change, such as from high to low or vice versa, depending on the updated data. In such cases, the controller device 250 can adjust control of the connectivity between the user equipment 230 and the network node 220, such as by switching between disabling the connectivity and enabling the connectivity and/or switching between preventing establishment of the connectivity and permitting establishment of the connectivity.

It is to be understood and appreciated that the controller device 250 can determine the probability based on various combinations of the information items and corresponding threshold(s). It is also to be understood and appreciated that the controller device 250 can compare an information item and a single threshold, as described above, compare an information item and multiple thresholds, which may enable to the controller device 250 to determine various levels of probability (e.g., low, low/medium, medium, medium/high, high, and/or the like) and dynamically control the dual connectivity mode for the user equipment 230 accordingly.

It is further to be understood and appreciated that, while embodiments of the controller device 250 are described herein with respect to determining a probability of a call session being interrupted, such as becoming disconnected or dropped, the controller device 250 can additionally, or alternatively, determine a probability of a call session remaining connected, a probability of a quality of a call session becoming impaired, or otherwise affected, and so on, and control the dual connectivity mode of the network based on information item(s) and associated threshold(s) similar to those described above. For example, in a case where the controller device 250 determines that the probability of a call session remaining connected is high, the controller device 250 can maintain the dual connectivity mode of the network for the user equipment 230 or otherwise permit establishment of the dual connectivity mode of the network for the user equipment 230. Continuing with the example, in a case where the controller device 250 determines that the probability of a call session remaining connected is low, the controller device 250 can disable the dual connectivity mode of the network for the user equipment 230 or otherwise prevent establishment of the dual connectivity mode of the network for the user equipment 230. As another example, in a case where the controller device 250 determines that the probability of a quality of a call session becoming impaired, or otherwise affected, is high, the controller device 250 can disable the dual connectivity mode of the network for the user equipment 230 or otherwise prevent establishment of the dual connectivity mode of the network for the user equipment 230.

It is still further to be understood and appreciated that the quantity and arrangement of nodes, devices, and networks shown in FIG. 2A are provided as an example. In practice, there may be additional nodes, devices, and/or networks, fewer nodes, devices, and/or networks, different nodes, devices, and/or networks, or differently arranged nodes, devices, and/or networks than those shown in FIG. 2A. For example, the network system 200 can include more or fewer network nodes 210, network nodes 220, user equipment 230, core networks 240, controller devices 250, etc. Furthermore, two or more nodes or devices shown in FIG. 2A may be implemented within a single node or device, or a single node or device shown in FIG. 2A may be implemented as multiple, distributed nodes or devices. Additionally, or alternatively, a set of nodes or devices (e.g., one or more nodes or devices) of the network system 200 may perform one or more functions described as being performed by another set of nodes or devices of the network system 200.

Figure 2B:
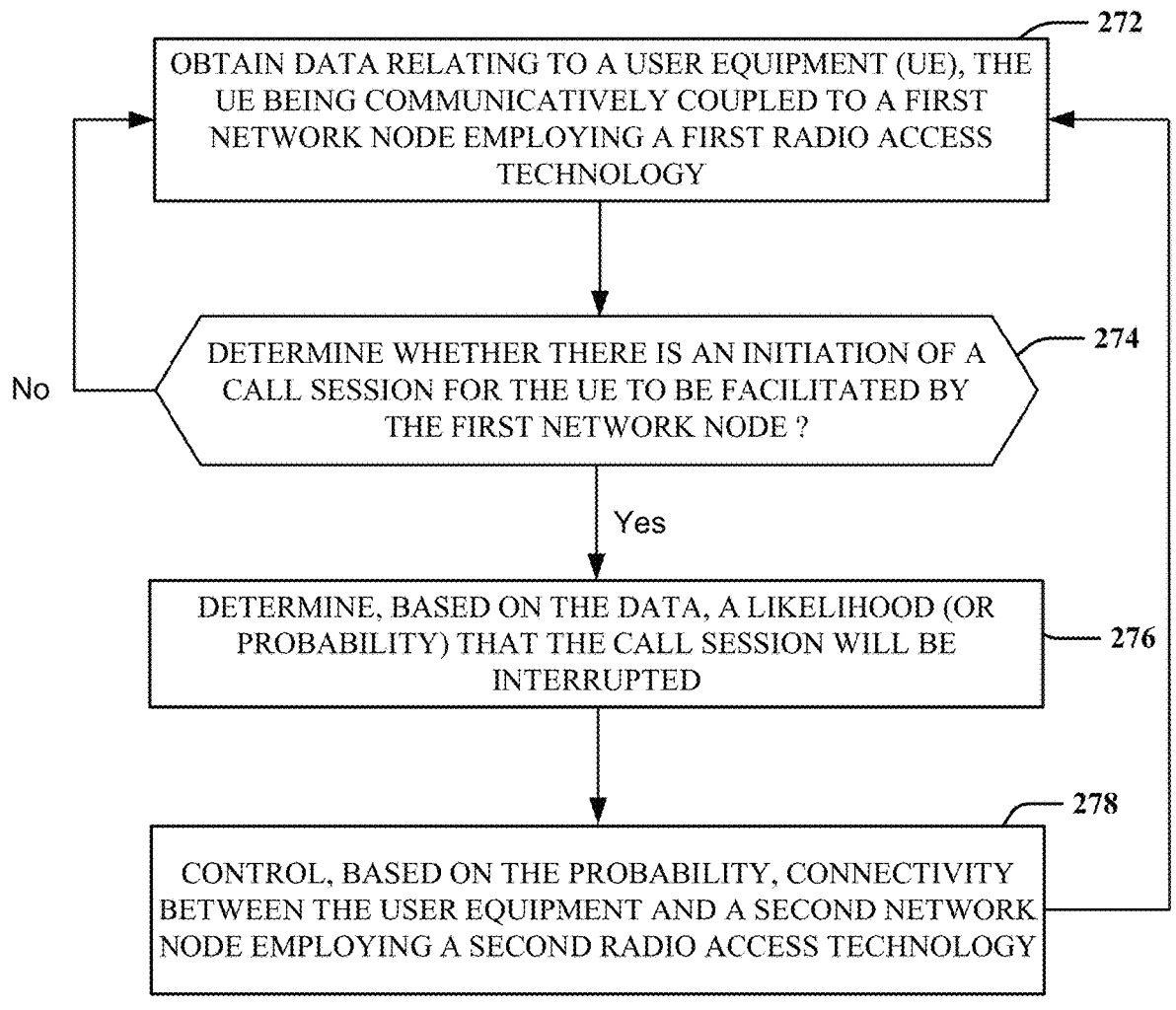
FIG. 2B depicts an illustrative embodiment of a method in accordance with various aspects described herein.

FIG. 2B depicts an illustrative embodiment of a method 270 in accordance with various aspects described herein. In some embodiments, one or more process blocks of FIG. 2B can be performed by a controller device, such as the controller device 250. In some embodiments, one or more process blocks of FIG. 2B may be performed by another device or a group of devices separate from or including the controller device 250, such as the network node 210, the network node 220, the core network 240, and/or the user equipment 230.

At 272, the method can include obtaining data relating to a user equipment, where the user equipment is communicatively coupled to a first network node employing a first radio access technology. For example, the controller device 250 can obtain data relating to the user equipment 230 in a manner similar to that described above with respect to the network system 200 of FIG. 2A, where the user equipment 230 is communicatively coupled to the network node 210 employing LTE technology.

At 274, the method can include determining whether there is an initiation of a call session for the user equipment to be facilitated by the first network node. For example, the controller device 250 can determine whether there is an initiation of a VoLTE call session for the user equipment 230 in a manner similar to that described above with respect to the network system 200 of FIG. 2A.

If the controller device 250 determines that there is no initiation of a call session for the user equipment 230, then the method can return to block 272. If the controller device 250 determines that there is an initiation of a call session for the user equipment 230, then, at 276, the controller device 250 can determine, based on the data relating to the user equipment 230, a likelihood (or probability) that the call session will be interrupted (e.g., dropped or disconnected).

At 278, the method can include controlling, based on the probability, connectivity between the user equipment and a second network node employing a second radio access technology. For example, the controller device 250 can control, based on the probability, connectivity between the user equipment 230 and the network node 220 employing 5G technology (or a higher generation network technology) in a manner similar to that described above with respect to the network system 200 of FIG. 2A.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, communication network 180, the subsystems and functions of network system 200 and method 270 presented in FIGS. 1A, 1B, 2A, and 2B. For example, virtualized communication network 300 can facilitate in whole or in part call session management via dynamic control, for a user equipment, of a dual connectivity mode of a network—e.g., EN-DC, where network access is provided over a first band (e.g., an LTE band) and a second band (e.g., an NR band)—by selectively activating and/or deactivating a connection between the user equipment and the network over the second band, depending on a probability of service interruption in the first band.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1A), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
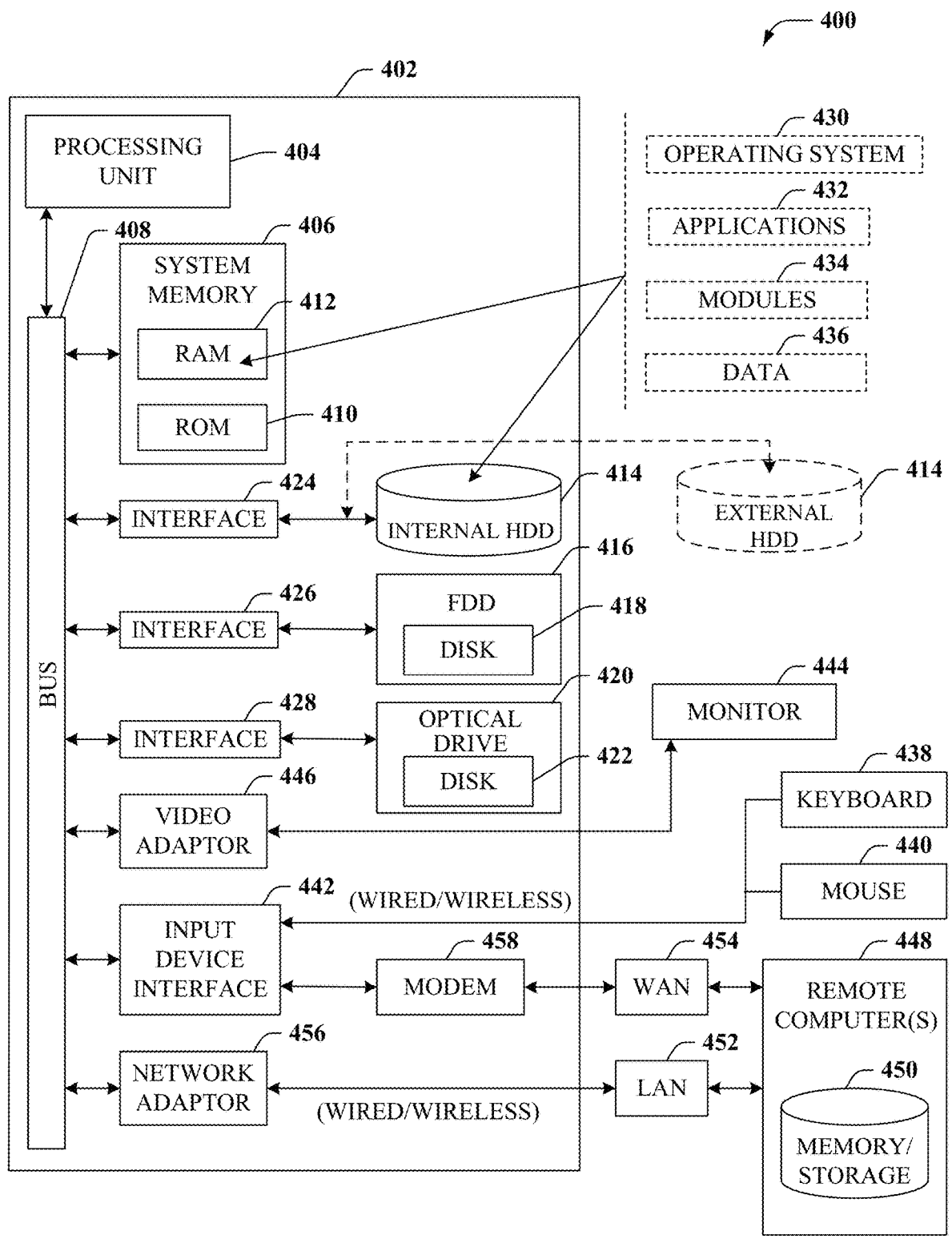
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part call session management via dynamic control, for a user equipment, of a dual connectivity mode of a network—e.g., EN-DC, where network access is provided over a first band (e.g., an LTE band) and a second band (e.g., an NR band)—by selectively activating and/or deactivating a connection between the user equipment and the network over the second band, depending on a probability of service interruption in the first band.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communication network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communication network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
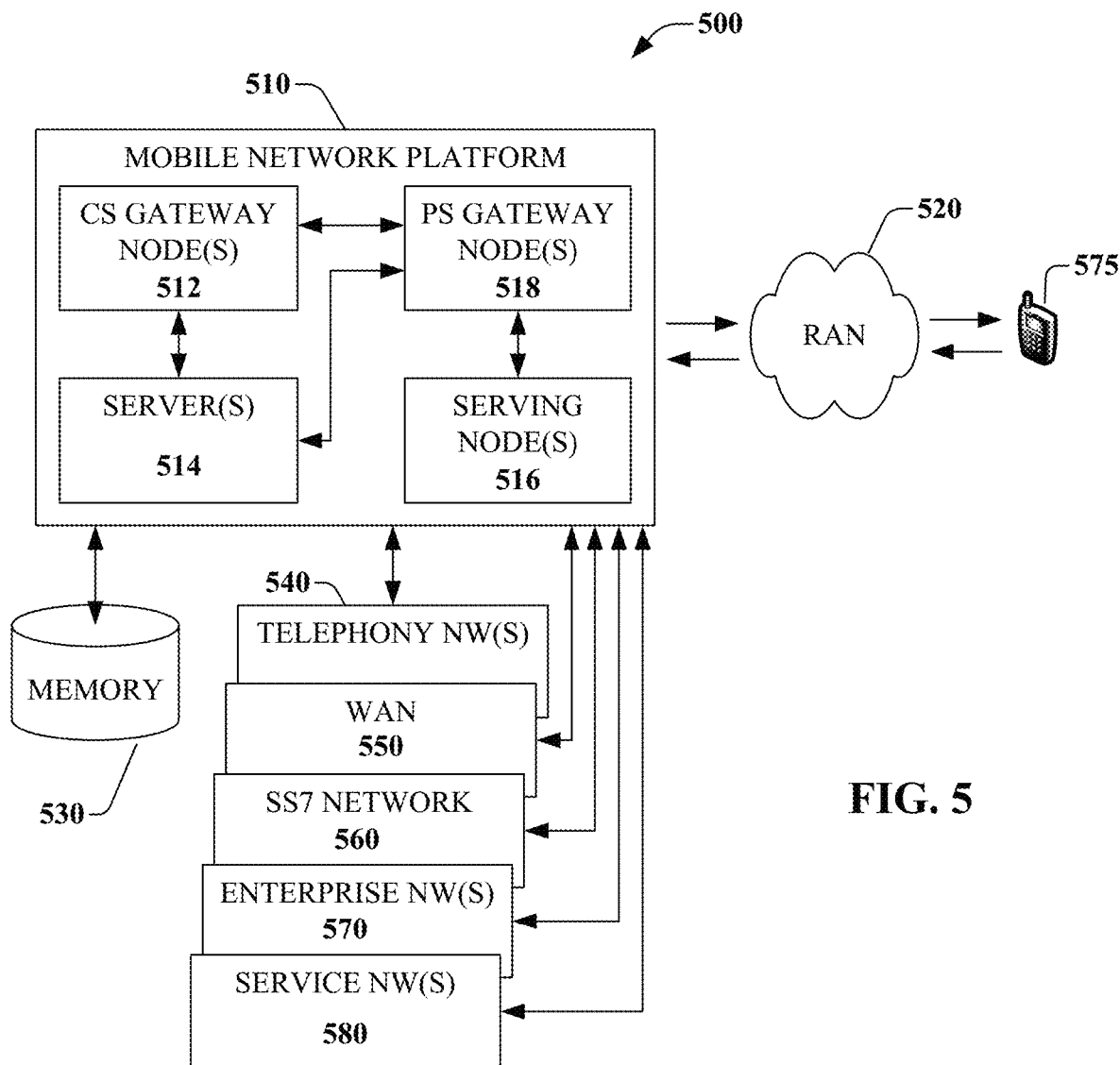
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part call session management via dynamic control, for a user equipment, of a dual connectivity mode of a network—e.g., EN-DC, where network access is provided over a first band (e.g., an LTE band) and a second band (e.g., an NR band)—by selectively activating and/or deactivating a connection between the user equipment and the network over the second band, depending on a probability of service interruption in the first band.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact.

Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1A that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
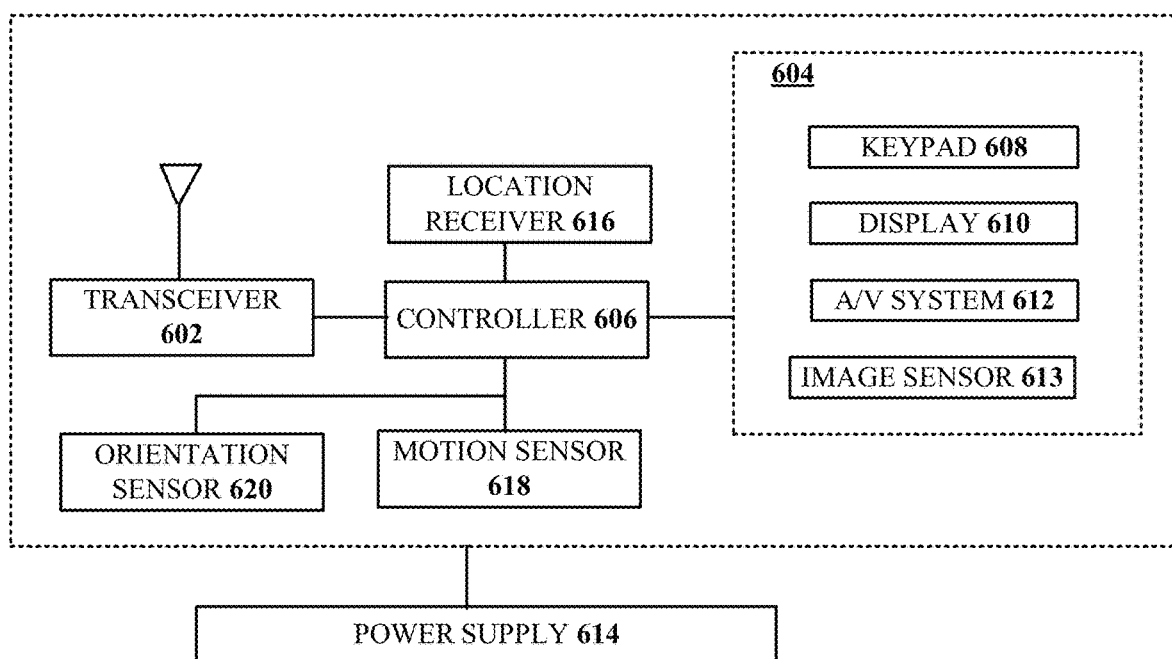
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communication network 125. For example, communication device 600 can facilitate in whole or in part call session management via dynamic control, for a user equipment, of a dual connectivity mode of a network—e.g., EN-DC, where network access is provided over a first band (e.g., an LTE band) and a second band (e.g., an NR band)—by selectively activating and/or deactivating a connection between the user equipment and the network over the second band, depending on a probability of service interruption in the first band.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAIVI). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining data relating to a user equipment, wherein the user equipment is communicatively coupled to a first network node, wherein the first network node employs a first radio access technology, and wherein the data relating to the user equipment includes information regarding a transmit (Tx) power of the user equipment relative to the first network node;
   determining whether there is an initiation of a call session for the user equipment to be facilitated by the first network node;
   determining, according to the data relating to the user equipment and responsive to determining that there is an initiation of a call session for the user equipment to be facilitated by the first network node, a probability that the call session will be interrupted, wherein the determining the probability that the call session will be interrupted is based on the Tx power of the user equipment relative to the first network node; and
   controlling connectivity between the user equipment and a second network node based on the probability that the call session will be interrupted, wherein the second network node employs a second radio access technology.

2. The device of claim 1, wherein the call session comprises a voice call session or a video call session.

3. The device of claim 1, wherein the data relating to the user equipment includes information regarding a Tx power of the user equipment relative to the second network node, and wherein the determining the probability that the call session will be interrupted is based on the Tx power of the user equipment relative to the second network node.

4. The device of claim 1, wherein the data relating to the user equipment includes information regarding a network resource demand of the user equipment, and wherein the determining the probability that the call session will be interrupted is based on the network resource demand of the user equipment.

5. The device of claim 1, wherein the data relating to the user equipment includes information regarding a signal strength of the first network node relative to the user equipment, and wherein the determining the probability that the call session will be interrupted is based on the signal strength of the first network node relative to the user equipment.

6. The device of claim 1, wherein the data relating to the user equipment includes information regarding a distance between the user equipment and the first network node, and wherein the determining the probability that the call session will be interrupted is based on the distance between the user equipment and the first network node.

7. The device of claim 1, wherein the determining the probability that the call session will be interrupted comprises determining that a value of an information item in the data relating to the user equipment satisfies a threshold.

8. The device of claim 1, wherein the controlling the connectivity between the user equipment and the second network node comprises one of deactivating a dual connectivity mode of a network for the user equipment, preventing establishment of the dual connectivity mode of the network for the user equipment, maintaining the dual connectivity mode of the network for the user equipment, permitting establishment of the dual connectivity mode of the network for the user equipment, or a combination thereof.

9. The device of claim 1, wherein the determining whether there is an initiation of a call session for the user equipment to be facilitated by the first network node comprises determining whether there is an initiation of a voice over Long Term Evolution (LTE) call for the user equipment.

10. A non-transitory machine-readable storage device, comprising executable instructions that, when executed by a processing system including a processor, facilitate performance of operations comprising:

receiving data relating to a user equipment, wherein the user equipment is communicatively coupled to a first network node, wherein the first network node employs a first radio access technology, and wherein the data relating to the user equipment includes information regarding a transmit (Tx) power of the user equipment relative to a second network node;

determining that there is an ongoing call session at the user equipment facilitated by the first network node;

determining, according to the data relating to the user equipment and responsive to the determining that there is an ongoing call session at the user equipment facilitated by the first network node, a probability that a quality of the ongoing call session will become impaired, wherein the determining the probability that the quality of the ongoing call session will become impaired is based on the Tx power of the user equipment relative to the second network node; and controlling connectivity between the user equipment and the second network node based on the probability that the quality of the ongoing call session will become impaired, wherein the second network node employs a second radio access technology.

11. The non-transitory machine-readable storage device of claim 10, wherein the data relating to the user equipment includes information regarding a Tx power of the user equipment relative to the first network node, and wherein the determining the probability that the quality of the ongoing call session will become impaired is based on the Tx power of the user equipment relative to the first network node.

12. The non-transitory machine-readable storage device of claim 10, wherein the ongoing call session comprises a voice call session or a video call session.

13. The non-transitory machine-readable storage device of claim 10, wherein the data relating to the user equipment includes information regarding a network resource demand of the user equipment, and wherein the determining the probability that the quality of the ongoing call session will become impaired is based on the network resource demand of the user equipment.

14. The non-transitory machine-readable storage device of claim 10, wherein the data relating to the user equipment includes information regarding a signal strength of the first network node relative to the user equipment, and wherein the determining the probability that the quality of the ongoing call session will become impaired is based on the signal strength of the first network node relative to the user equipment.

15. The non-transitory machine-readable storage device of claim 10, wherein the controlling the connectivity between the user equipment and the second network node comprises one of deactivating a dual connectivity mode of a network for the user equipment, preventing establishment of the dual connectivity mode of the network for the user equipment, maintaining the dual connectivity mode of the network for the user equipment, permitting establishment of the dual connectivity mode of the network for the user equipment, or a combination thereof.

16. A method, comprising:

obtaining, by a processing system including a processor, data relating to a user equipment, wherein the user equipment is communicatively coupled to a first network node of a network and to a second network node of the network, wherein the first network node employs a first radio access technology, wherein the second network node employs a second radio access technology, and wherein the data relating to the user equipment includes information regarding a speed of movement of the user equipment;

determining, by the processing system, whether there is an initiation of a call session for the user equipment to be facilitated by the first network node;

determining, by the processing system, according to the data relating to the user equipment and responsive to determining that there is an initiation of a call session for the user equipment to be facilitated by the first network node, that a probability of the call session becoming disconnected satisfies a threshold, wherein the determining that the probability of the call session becoming disconnected satisfies the threshold is based on the information regarding the speed of movement of the user equipment; and maintaining, by the processing system, connectivity between the user equipment and the second network node responsive to the determining that the probability of the call session becoming disconnected satisfies the threshold.

17. The method of claim 16, wherein the determining that the probability of the call session becoming disconnected satisfies the threshold comprises determining that the probability of the call session becoming disconnected is less than or equal to the threshold.

18. The method of claim 16, wherein the maintaining the connectivity between the user equipment and the second network node comprises maintaining a dual connectivity mode of the network for the user equipment.

19. The method of claim 16, wherein the call session comprises a voice call session or a video call session.

20. The method of claim 16, wherein the data relating to the user equipment includes information regarding a transmit (Tx) power of the user equipment relative to the first network node or the second network node, and wherein the determining that the probability of the call session becoming disconnected satisfies the threshold is based on the information regarding the Tx power of the user equipment relative to the first network node or the second network node.

* * * * *

UNITED STATES PATENT AND TRADEMARK OFFICE
CERTIFICATE OF CORRECTION

PATENT NO. : 11,452,010 B2
APPLICATION NO. : 17/095566
DATED : September 20, 2022
INVENTOR(S) : Daniel Vivanco et al.

It is certified that error appears in the above-identified patent and that said Letters Patent is hereby corrected as shown below:

In the Specification

Column 7, Line 66, "MC" should be replaced with "RIC"

Column 25, Line 64, "DRRAIVI" should be replaced with "DRRAM"

Signed and Sealed this
Twenty-fifth Day of October, 2022

Katherine Kelly Vidal
*Director of the United States Patent and Trademark Office*